United States Patent

Shoemaker

[11] 3,902,791
[45] Sept. 2, 1975

[54] 40× MICROSCOPE OBJECTIVE

[75] Inventor: Arthur H. Shoemaker, East Aurora, N.Y.

[73] Assignee: American Optical Corporation, Southbridge, Mass.

[22] Filed: Apr. 26, 1974

[21] Appl. No.: 464,386

[52] U.S. Cl. .......... 350/175 ML; 350/176; 350/224
[51] Int. Cl.² ....................... G02B 9/34; G02B 1/00
[58] Field of Search ............. 350/175 ML, 224, 176

[56] References Cited
UNITED STATES PATENTS
3,380,793    4/1968    Klein............................ 350/175 ML

*Primary Examiner*—Paul A. Sacher
*Attorney, Agent, or Firm*—Alan H. Spencer; William C. Nealon; H. R. Berkenstock, Jr.

[57] ABSTRACT

A four member microscope objective having a numerical aperture of substantially 0.66 and a magnification of substantially 40× provides a substantially flat image field of about 24mm.

3 Claims, 1 Drawing Figure

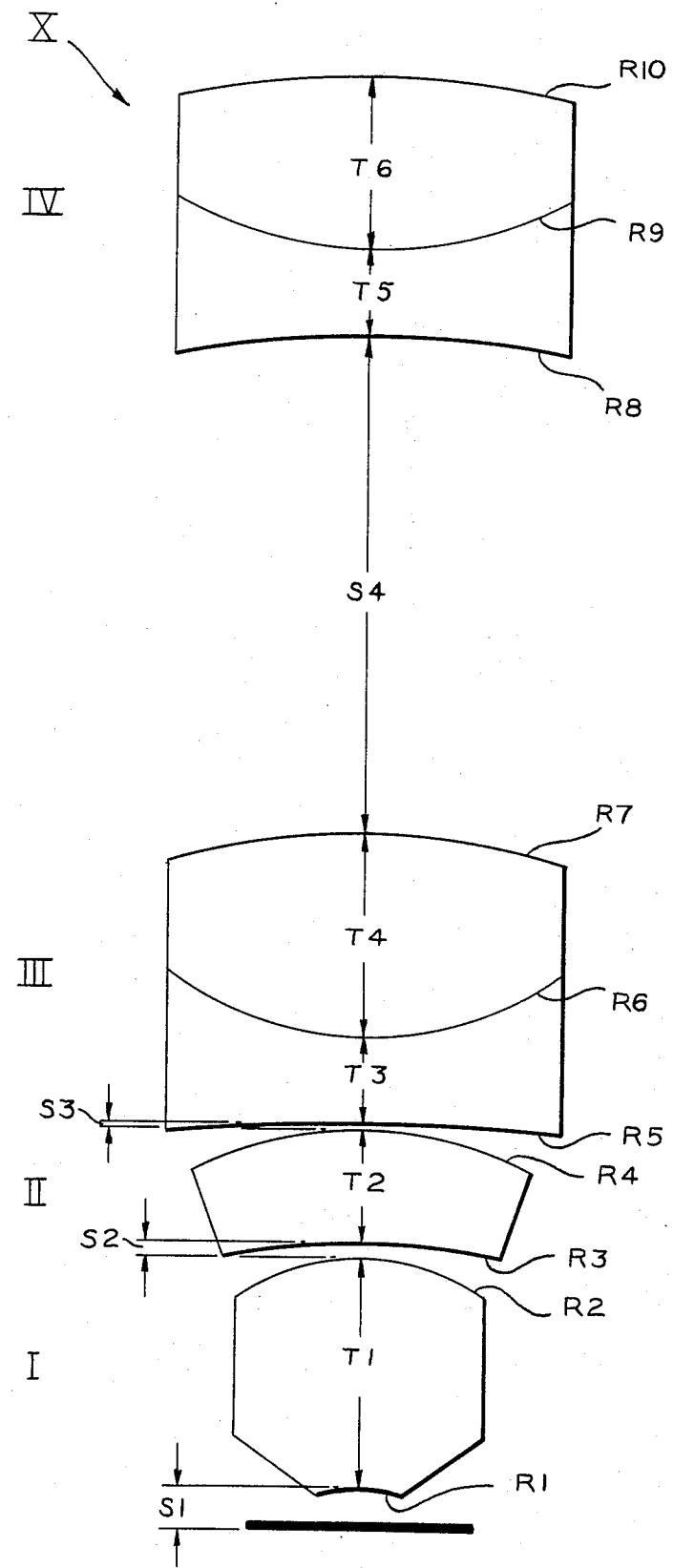

40× MICROSCOPE OBJECTIVE

BACKGROUND OF THE INVENTION

The present invention relates to microscope objectives and more particularly to an achromatic microscope objective having a numerical aperture of substantially 0.66 and a magnification of substantially 40X, in which chromatic and spherical aberrations, coma, and astigmatism are well corrected while yet providing a substantially flat image field of about 24mm when used with a telescope objective as described in U.S. Pat. No. 3,355,234.

DRAWING AND INVENTION

The drawing is an optical diagram of the microscope objective X having lens elements I, II, III and IV in optical alignment along an axis extending from the object plane O. The first element I is a concavo-convex positive singlet, the second element II is a concavo-convex positive singlet, the third element III is a concavo-convex positive doublet and the fourth element IV is a concavo-convex negative doublet. The parameters of objective X are set forth in Table I wherein the axial thicknesses of successive lens elements are designated T1 to T6, and the successive axial spaces from the object plane (designated O) are S1 to S4. The successive lens radii are designated R1 to R10 where the minus sign (−) applies to surfaces whose center of curvature lies on the object side of their vertices. The refractive indices and Abbe numbers of the glasses in the successive lenses are absolute fixed values designated ND(1) to ND(6), and $\nu(1)$ to $\nu(6)$ respectively, and F is the objective focal length in millimeters.

TABLE I

| Lens | Radius | Thickness | Space | Refractive Index | Abbe Number |
|------|--------|-----------|-------|------------------|-------------|
|      |        |           | $S_1$=0.15778F |          |             |
| I    | $R_1$ = − 0.52926F | $T_1$=0.87336F |       | ND(1)=1.78833 | $\nu(1)$=50.47 |
|      | $R_2$ = − 0.84825F |           | $S_2$=0.05459F |          |             |
| II   | $R_3$ = − 7.87116F | $T_2$=0.43668F |       | ND(2)=1.78833 | $\nu(2)$=50.47 |
|      | $R_4$ = − 1.46441F |           | $S_3$=0.02183F |          |             |
|      | $R_5$ = −17.40323F |           |       |                |             |
| III  | $R_6$ = 1.30786F | $T_3$=0.32751F |       | ND(3)=1.80491 | $\nu(3)$=25.42 |
|      | $R_7$ = − 2.70087F | $T_4$=0.76419F |       | ND(4)=1.71687 | $\nu(4)$=47.98 |
|      | $R_8$ = −12.83970F |           | $S_4$=1.89082F |          |             |
| IV   | $R_9$ = 1.61921F | $T_5$=0.32751F |       | ND(5)=1.80784 | $\nu(5)$=40.74 |
|      | $R_{10}$ = − 3.60479F | $T_6$=0.65502F |       | ND(6)=1.54804 | $\nu(6)$=45.75 |

A specific embodiment of the present invention is an objective with a focal length of 4.580mm and has the values set forth in Table II.

TABLE II

| Lens | Radius | Thickness | Space |
|------|--------|-----------|-------|
|      |        |           | $S_1$=0.7226 |
| I    | $R_1$= − 2.424 | $T_1$=4.000 |       |
|      | $R_2$= − 3.885 |           |       |
|      |        |           | $S_2$=0.2500 |
| II   | $R_3$=−36.050 | $T_2$=2.000 |       |
|      | $R_4$= − 6.707 |           |       |
|      | $R_5$=−79.707 |           | $S_3$=0.1000 |
|      |        | $T_3$=1.500 |       |

TABLE II — Continued

| Lens | Radius | Thickness | Space |
|------|--------|-----------|-------|
| III  | $R_6$= 5.990 | $T_4$=3.500 |       |
|      | $R_7$=−12.370 |           |       |
|      | $R_8$=−58.806 |           | $S_4$=8.660 |
|      |        | $T_5$=1.500 |       |
| IV   | $R_9$= 7.416 | $T_6$=3.000 |       |
|      | $R_{10}$=−16.510 |       |       |

The stated values of the objectives hereinabove are variable within the limits of normal manufacturing tolerances.

What is claimed is:

1. A microscope objective having a numerical aperture of substantially 0.66, which is well corrected for chromatic image aberrations, spherical aberration, coma and astigmatism and four elements aligned along an optical axis extending from an object plane, comprises, a concavo-convex positive singlet I as the first element, a concavo-convex positive singlet II as the second element, a concavo-convex positive doublet III as the third element and a concavo-convex negative doublet IV as the fourth element.

2. The microscope objective of claim 1 having the following optical parameters:

| Lens | Radius | Thickness | Space | Refractive Index | Abbe Number |
|------|--------|-----------|-------|------------------|-------------|
|      |        |           | $S_1$=0.15778F |          |             |
| I    | $R_1$ = − 0.52926F | $T_1$=0.87336F |       | ND(1)=1.78833 | $\nu(1)$=50.47 |
|      | $R_2$ = − 0.84825F |           | $S_2$=0.05459F |          |             |
| II   | $R_3$ = − 7.87116F | $T_2$=0.43668F |       | ND(2)=1.78833 | $\nu(2)$=50.47 |
|      | $R_4$ = − 1.46441F |           | $S_3$=0.02183F |          |             |
|      | $R_5$ = −17.40323F |           |       |                |             |
| III  | $R_6$ = 1.30786F | $T_3$=0.32751F |       | ND(3)=1.80491 | $\nu(3)$=25.42 |
|      | $R_7$ = − 2.70087F | $T_4$=0.76419F |       | ND(4)=1.71687 | $\nu(4)$=47.98 |
|      | $R_8$ = −12.83970F |           | $S_4$=1.89082F |          |             |
| IV   | $R_9$ = 1.61921F | $T_5$=0.32751F |       | ND(5)=1.80784 | $\nu(5)$=40.74 |
|      | $R_{10}$ = − 3.60479F | $T_6$=0.65502F |       | ND(6)=1.54804 | $\nu(6)$=45.75 | wherein axial thicknesses of successive lens elements are T1 to T6, successive axial spaces are S1 to S4, successive lens radii are R1 to R10 where − applies to surfaces whose center of curvature lies on the object side of the vertices, refractive indices and Abbe numbers of the successive lenses are ND(1) to ND(6), $\nu(1)$ to $\nu(6)$ respectively and F is the objective focal length in millimeters.

3. The microscope objective of claim 1 wherein F is 4.580.

* * * * *